(12) United States Patent
Al-Shalash

(10) Patent No.: US 8,805,433 B2
(45) Date of Patent: Aug. 12, 2014

(54) SYSTEM AND METHOD FOR POINT TO MULTIPOINT RADIO SURVEY

(75) Inventor: Steven Ali Al-Shalash, Frisco, TX (US)

(73) Assignee: Steven Ali Al-Shalash, Frisco, TX (US)

( * ) Notice: Subject to any disclaimer, the term of this patent is extended or adjusted under 35 U.S.C. 154(b) by 334 days.

(21) Appl. No.: 13/405,376

(22) Filed: Feb. 27, 2012

(65) Prior Publication Data

US 2013/0225229 A1 Aug. 29, 2013

(51) Int. Cl.
*H04B 7/00* (2006.01)
*H04B 7/02* (2006.01)
*H04B 17/00* (2006.01)

(52) U.S. Cl.
USPC ......... 455/524; 455/525; 455/101; 455/67.11

(58) Field of Classification Search
CPC ..................................................... H04L 1/1671
USPC ................................ 455/524, 525, 101, 67.11
See application file for complete search history.

(56) References Cited

U.S. PATENT DOCUMENTS

| | | | |
|---|---|---|---|
| 7,058,367 B1 * | 6/2006 | Luo et al. ...................... | 455/101 |
| 7,463,867 B2 * | 12/2008 | Luo et al. ...................... | 455/101 |
| 7,792,500 B2 * | 9/2010 | Luo et al. ...................... | 455/101 |
| 7,929,925 B2 * | 4/2011 | Luo et al. ...................... | 455/101 |
| 8,359,643 B2 * | 1/2013 | Low et al. ...................... | 726/9 |
| 8,433,258 B2 * | 4/2013 | Luo et al. ...................... | 455/101 |
| 2006/0166626 A1 * | 7/2006 | Luo et al. ...................... | 455/69 |
| 2009/0092201 A1 * | 4/2009 | Luo et al. ...................... | 375/267 |
| 2010/0278155 A1 * | 11/2010 | Luo et al. ...................... | 370/336 |
| 2011/0176599 A1 * | 7/2011 | Luo et al. ...................... | 375/227 |
| 2013/0237159 A1 * | 9/2013 | Luo et al. ...................... | 455/67.13 |

* cited by examiner

*Primary Examiner* — Tilahun B Gesesse

(57) ABSTRACT

A methodology and system for performing radio network coverage surveys of multiple site candidates concurrently using one reserved channel based on reverse path signal strength measurements of a signal from a test mobile station transmitter (100) to a plurality of prospective base station receiver sites (200, 200', . . . ) over a geographical area is presented. The instantaneous position, time-stamp and power of the Transmitter (101) is recorded and stored as it moves along a test route(s). Stationary Test Receiver(s) (201) tuned to the selected channel at each prospective site location (200, 200', . . . ) save received instantaneous signal strength and, it's time-stamp so they can matched up to the position of the Test Transmitter (101) and used to ascertain received signal strength at each site. Results can be useful for ascertaining optimum site locations, antenna configurations, propagation model tuning, frequency planning, pilot planning and extraction of signal correlation statistics.

23 Claims, 4 Drawing Sheets

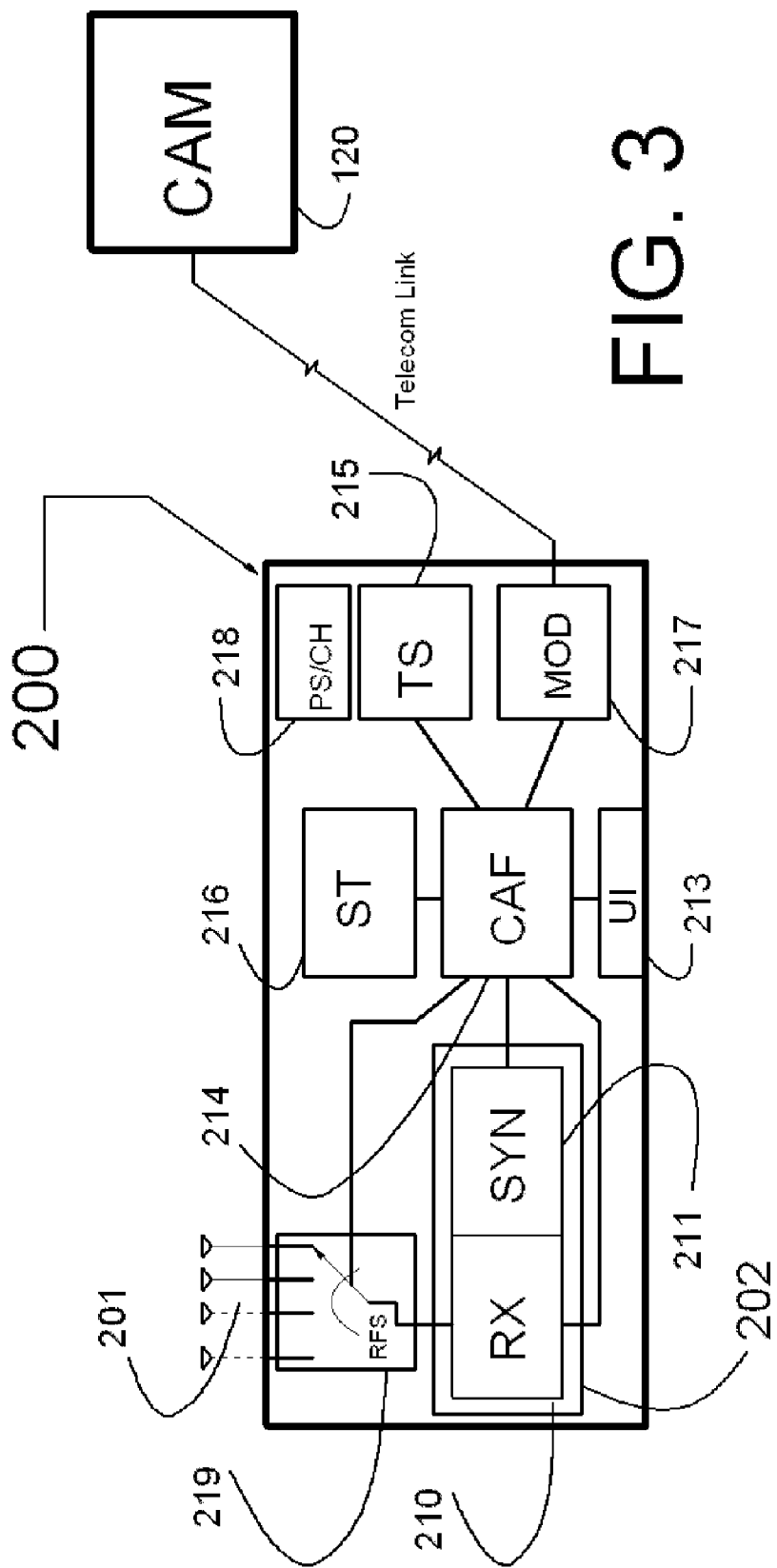

SYSTEM AND METHOD FOR POINT TO MULTIPOINT RADIO SURVEY

FEDERALLY SPONSORED RESEARCH

Not Applicable

SEQUENCE LISTING OF PROGRAMS

Not Applicable

BACKGROUND

1. Field of Invention

This invention generally relates to the field of mobile and fixed wireless communications systems. More particularly the invention pertains to a methodology for performing radio frequency coverage surveys based on actual measurements of radio signal strengths, as propagated over the path from a test mobile station transmitter to one or more test base station receiver points (sites).

2. Description of Prior Art

In designing and implementing new wireless systems for radio communication, or in expanding existent systems, suitable methods are used to select optimal placements of new base station sites that provide for efficient use of the radio frequency spectrum in the given geographical area.

This optimal placement of the base station sites is based on dividing the geographical area under consideration into cells of radio coverage. Each of these cells is served primarily by one base station site operating in the allocated spectrum for that area.

A mobile device traveling through the geographical area can communicate via the base station serving the cell within which it is currently located. This will be the base station offering the best signal strength to the mobile device at that moment.

The cell used will change as the mobile travels through the geographical area. This change will occur in most cases due to a process called "hand off" based on which base station is offering the best signal to the mobile and visa versa. The term best signal here is based on multiple criteria, the most important of which, is in most cases defined in terms of the signal strength.

From the discussion above it is easy for a practitioner of the art, to see that the optimal base station location is that location from which the radio frequency coverage over the cell's geographical area is above a minimum acceptable level. Also, the selected location should work in conjunction with the surrounding cells served by the other base station sites within the constraints of the wireless technology at hand.

Not only is the location of the base station site very important, so is it's height (height of its antennas) as well as the physical placement of these antennas. For these reasons various methodologies and sophisticated software tools have been developed to assist in optimal base station site placement.

These tools are typically referred to as propagation prediction tools. They use terrain and even building databases to represent the topography in a given geographical area to a high degree of accuracy. This information is used to construct propagation path profiles, and apply the physical principles of radio wave propagation to predict the most likely average propagation path loss given the location of the base station, height and type of antenna at the base station, and the location and height of the receiving mobile device.

These programs calculate the predicted signal strength at a series of points blanketing the entire geographical area to produce detailed maps of radio frequency coverage strength and interference. The programs process various input and output layers. The inputs include terrain, land-use morphology, traffic or population data, and base station site data such as locations, antenna heights, types and orientations, as well as information that define what type of propagation model to use. Outputs include propagation signal strength and derived results, usually in the form of maps of coverage, interference, and relationships to other surrounding cells.

The propagation models used for prediction in these tools employ various degrees of abstraction to model the effects of reflection, diffraction, and scattering of the radio signals. Most will allow model parameter adjustments or generation of new models. Most have utilities to import radio survey data, perform statistical analysis, and implement changes to the models parameters to fit the data collected from the radio surveys. This process is called model tuning and is often preformed to adjust empirically derived models such as Okumura-Hata, COST-231-Hata and the Walfish-Ikegami model to name a few.

These empirical models are very widely used and accepted in the industry and are little more than mathematical curves fitted to radio survey data. This type of model is sufficiently accurate only if radio survey data is gathered for a sufficient number of representative sites and used to adjust the model for that particular geographical area and its representative morphologies.

As can be seen the exact prediction of signal levels from physical principles alone is impractical in real world situations. Radio surveys are thus much more reliable than predictions. These surveys are also necessary to tune the propagation models used.

Quite often a radio survey is required for any specific base-station site candidate before the space is leased or actual construction occurs. In most cases multiple candidates must be analyzed and perhaps surveyed using a test transmitter before any decision is taken. However, all these radio surveys are physically much more difficult, time-consuming and costly when compared to predictions.

Several manufactures market commercial tools for radio survey measurement data collection suitable for various mobile communication standards and radio frequency bands.

SUMMARY OF THE INVENTION

These and other problems are generally solved or circumvented, and technical advantages are generally achieved, by embodiments of a system and a method for carrying out radio link surveys of candidate cell site locations.

In accordance with an embodiment, a method for simultaneously performing a radio frequency evaluation survey of multiple base station site candidates is provided. The method includes transmitting one or more radio test signals from a mobile test unit located in a test vehicle, receiving the radio test signals at each of a plurality of stationary test receivers, measuring the signal strength of the radio test signals at each of the test receivers, and recording the signal strength of these measurements along with a time stamp for each measurement. The recorded signal strength measurements are correlated with the location of the mobile test unit by matching corresponding time stamps. The path loss between the location of each base station candidate site, and each location along the drive route can then be calculated as the ratio of transmitted and received test signals for the appropriate timestamp corresponding to the location of the test vehicle.

In accordance with an embodiment, an exemplary structure for a stationary test receiver unit is provided. This unit includes a receiver control and alarm function that communicates to all other blocks of the test receiver unit, a receiver unit which includes a radio frequency receiver and a frequency synthesizer, a plurality of receive antennas connected to the input of the radio frequency receiver, a radio frequency switch that connects one or more of the antennas to the receiver, a timing system to provide accurate time stamps for each measurement sample, a storage device to store the signal strength measurements and the corresponding time stamps, a user interface to allow for operator provides configuration and downloading of data to external devices, a wireless modem to connect to external locations, and a power supply and battery charging to supply power to all parts the test receiver In accordance with an embodiment, an exemplary structure for mobile test transmitter is provided. This unit includes a transmitter control and alarm function block that performs all control and alarming functions of said mobile test transmitter, wherein said alarm function block that communicates to all other blocks of the mobile test transmitter, a radio frequency transmitter unit which includes a radio frequency transmitter, a plurality of transmit antennas, a waveform and frequency synthesizer, a positioning and timing system to track the geographical location and the timing of the mobile test transmitter, a storage device or means to store the geographical location information and corresponding time stamp, a transmitter user interface to enable an operator to configure and control the test transmitter, a wireless modem to connect the mobile test transmitter unit wirelessly to an external location, and a power supply unit to supply power to the mobile test transmitter and its various constituent parts;

In accordance with an embodiment, an exemplary structure for a control and alarming mainframe is provided. This control and alarming mainframe collects operational data, alarms, faults and other information from the stationary test receiver units, and relays this information to the mobile test transmit unit. It also enables the remote control of the stationary test receiver units and the mobile test transmit unit.

The main object of this invention is to provide a new methodology of performing a radio survey of multiple base station site candidates concurrently. This methodology utilizes the reverse path for radio frequency signal strength measurements with a single dedicated radio frequency channel reserved in the radio band of interest over the geographical region where the radio survey is performed. In addition, suitable test apparatus and software for performing these tests and post-test preparation of the test results for useful analysis in a simple manner.

The method has various unique advantages over prior radio survey test systems, not least of which is it's cost effectiveness, speed, accuracy and simplicity. In addition it provides the ability to extract full correlation statistics for the signals of the various tests sites.

The foregoing has outlined rather broadly the features and technical advantages of the present invention in order that the detailed description of the embodiments that follow may be better understood. Additional features and advantages of the embodiments will be described hereinafter which for the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

OBJECTS AND ADVANTAGES

The method is unique from prior art in that it places a plurality of test receivers at a plurality of test sites.

The method is unique from prior art in that it uses a Mobile Test Transmitter that is moves throughout the test area.

The method is unique in that it allows several sites to be tested and evaluated simultaneously (with a single test drive). This has obvious advantages of speed and cost effectiveness.

The method is unique in that it allows the tester to exercise direct control over the test transmitter during the test. This means that such aspects as transmitter power, frequency, etc. can be accurately controlled and possibly changed if desired during the test run.

The method is unique in that it can be used to test multiple antennas and/or multiple antenna placement configurations with minimal increase (antennas and cables) in the needed test equipment at each test site.

The method is unique in that it enables a great amount of flexibility in the test site configuration. Since the receivers at the test sites are low power devices that can use battery or other forms of power sources, this means that they can be setup in almost any location, including but not limited to rooftops, communication towers, cranes, temporary structures, balloons, etc.

The method is unique in that it allows the testers to remotely control the operation of and observe the status of the test sites. This is accomplished through the use of an optional wireless or terrestrial modem at each test receiver. This greatly simplifies the test execution, as well as reduces the need for retests due to failures undetected until after the test.

The method is unique in that it enables full correlation statistics between different test sites, or different antennas on a single test site to be easily and accurately obtained from the post-processed data.

DRAWINGS

Brief Description of the Drawings

FIG. 3 block diagram showing both the Control and Monitoring Mainframe (CAM) entity again and the various blocks one of the Stationary Test Receiver s (STRX) that is used during the tests preformed in accordance with the methodology set forth in this invention.

REFERENCE NUMERALS IN DRAWINGS

- 100 Drive Test Vehicle,
- 100', 100" Mobile Test Transmitter Antenna(s),
- 200, 200', 300, 300', 300" Stationary Test Receivers,
- 201, 201', 301, 301", 301" Stationary Test Receiver Antennas,
- 400, 400',400", 400"", 400"" Optimal Area of Radio Coverage (Geographical Test Area),
- 500, 500', 600, 600', 600" Reverse Path Radio Links over which the test signal for the Radio Survey propagates.
- 700, 700', 800, 800', 800" Optional Wireless Links between plurality of Stationary Test Receivers (STRXs) and Control and Alarm Mainframe (CAM),
- 900 Radio Survey Drive Test Route(s),
- 101 Mobile Test Transmitter (MTTX),
- 102 MTTX Transmitter Unit (TU)
- 110 MTTX Radio Frequency Transmitter (TRX)
- 111 MTTX Synthesizer (SYN)
- 113 MTTX User Interface (UI)
- 114 MTTX Control and Alarm Function (CAF)
- 115 MTTX Position/Timing System (PS/TS)
- 116 MTTX Storage Unit (ST)
- 117 MTTX WM External Antenna
- 118 MTTX Wireless Modem (WM)
- 119 MTTX Power Supply (PS)
- 120 Control and Alarm Mainframe (CAM)
- 201 Stationary Test Receiver (STRX)
- 202 STRX Receiver Unit (RU)
- 210 STRX Radio Frequency Receiver (RX)
- 211 STRX Frequency Synthesizer (SYN)
- 213 STRX User Interface (UI)
- 214 STRX Control and Alarm Function (CAF)
- 215 STRX Timing System (TS)
- 216 STRX Storage Unit (ST)
- 217 STRX Modem (MOD)
- 218 STRX Power Supply/Battery Charging Unit (PS/CH)
- 219 STRX Radio Frequency Switch (RFS)

DETAILED DESCRIPTION

Figure 1A:
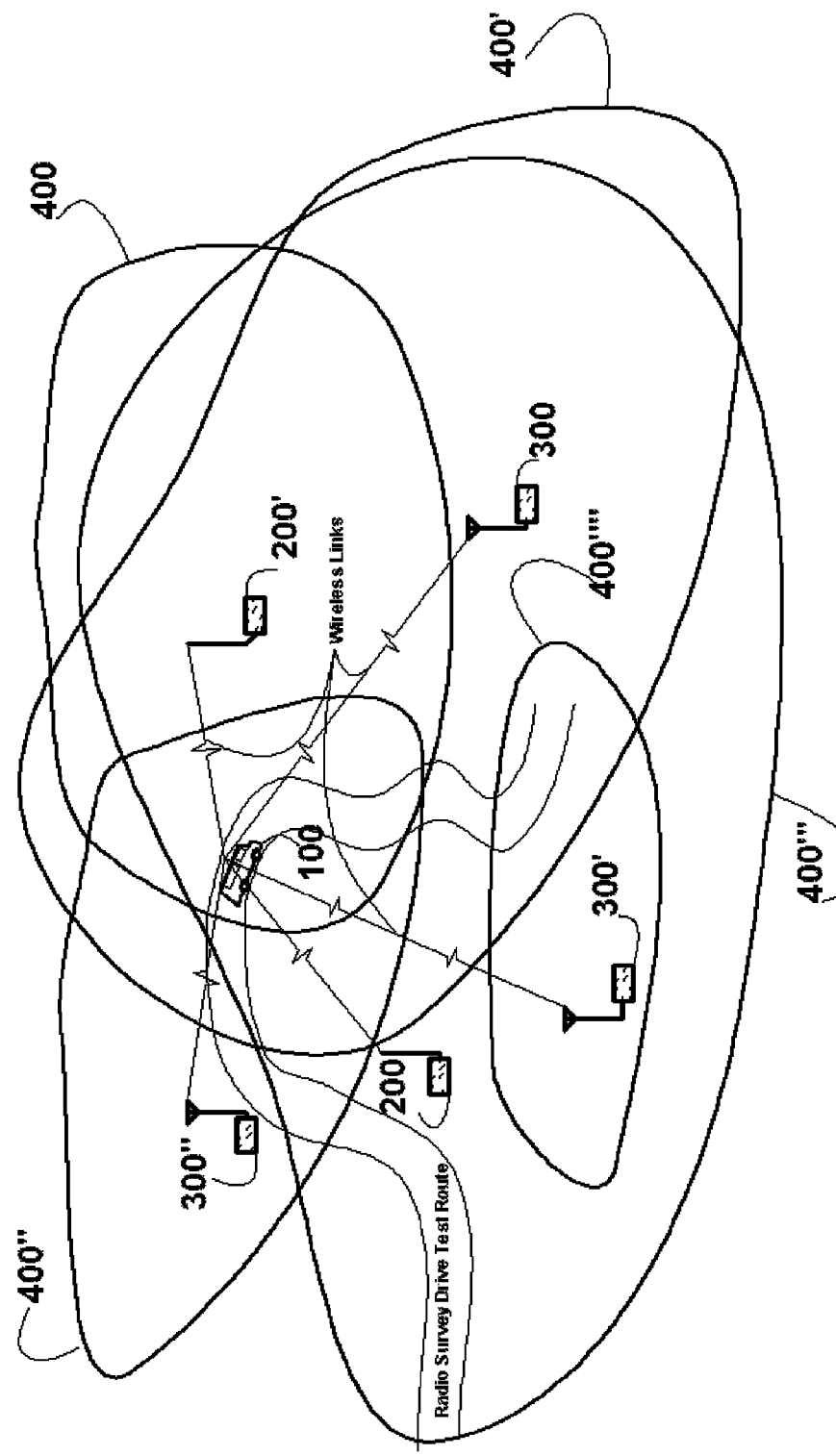
FIG. 1A depicts a Method for Point-to-Multipoint Reverse Path Radio System Survey over a certain geographical area of interest based on total coverage areas of deployed stationary receivers dependent on their characteristics (antenna characteristics, center-line height, terrain, foliage, etc.).
Figure 1B:
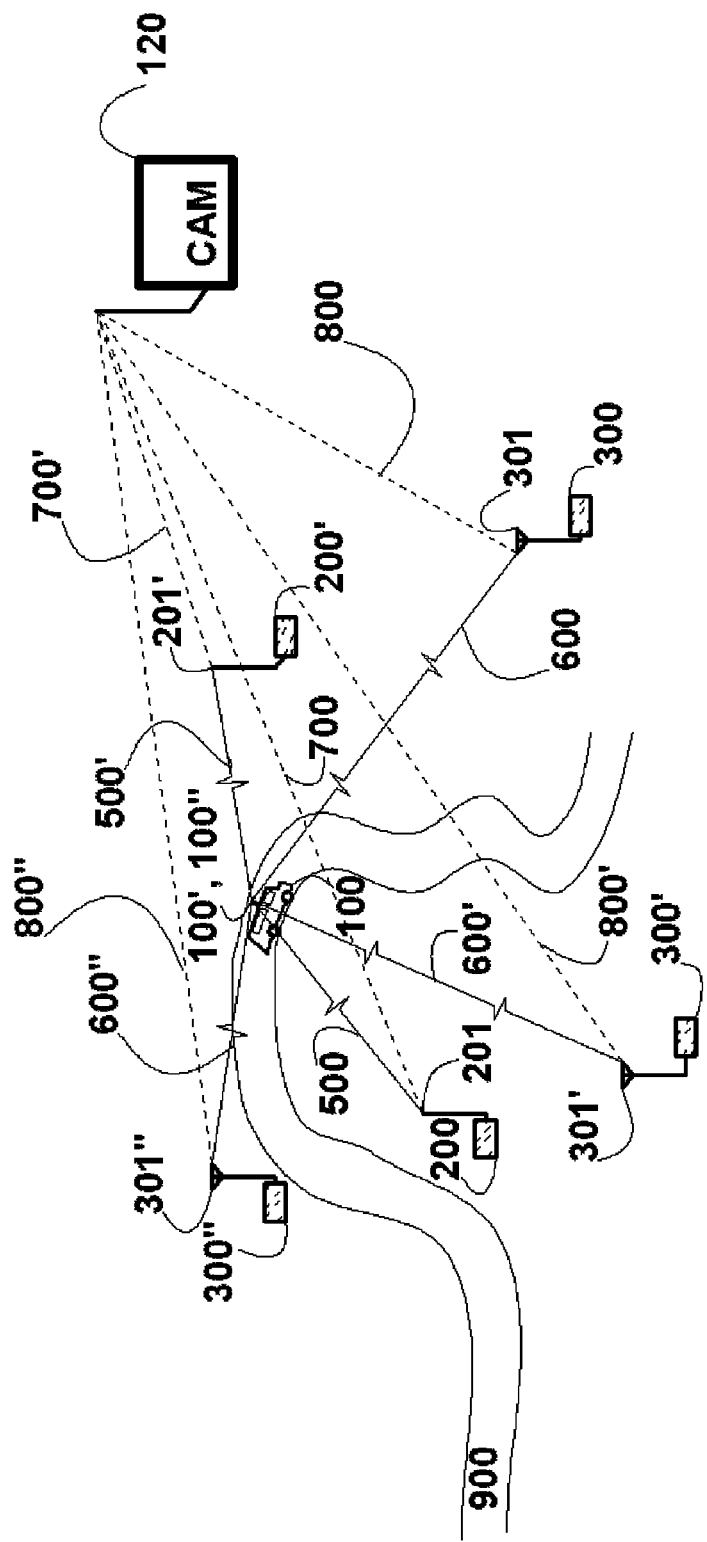
FIG. 1B depicts more detail the System and Method for Point-to-Multipoint Reverse Path Radio System Survey depicts a Reverse Path Radio System Survey. Showing the various system components and communication links of the system required for this method to succeed as set forth in this invention, including the Mobile Test Transmitter (MTTX), Control and Monitoring Mainframe (CAM) and a plurality of Stationary Test Receiver s (STRX) as well as the wireless links between these various entities.

FIGS. 1A and 1B Preferred Embodiments

FIGS. 1A and 1B illustrate radio survey test being preformed on the reverse radio link 500, 500', 600, 600', 600" simultaneously for a plurality of prospective base station candidate sites 200, 200', 300, 300', and 300" at each of which a Stationary Test Receiver 200, 200', 300, 300', 300", etc. (STRX) has been placed. At each of the prospective candidate site's one Stationary Test Receiver 200, 200', 300, 300', 300", etc. (STRX) is connected to a suitable omni-directional 201, 201', etc. or a sectorized 301, 301', 301", etc. receive antenna configuration depending on the survey test requirements for that particular site.

In this preferred embodiment these Stationary Test Receivers 200, 200', 300, 300', 300", etc. (STRX) sample the signal strength propagating towards them on the reverse radio link 500, 500', 600, 600', 600" at any given moment in time from the Mobile Test Transmitter 101 (MTTX) transported in a suitable drive test vehicle 100 at it travels along the predefined radio survey drive test route during the test.

The signal being transmitted from the Mobile Test Transmitter 101 (MTTX) is transmitted towards the various prospective base station site antennas 201, 201', 301, 301', 301", etc. from the drive test vehicle 100 via a suitable transmit antenna(s) 100', 100", etc. connected to the MOBILE TEST TRANSMITTER 101 (MTTX) and placed in or on the drive test vehicle as required by the specific test situation.

As can be seen from the preferred embodiment of this invention each prospective base station site will have a good or optimal area of radio coverage 400, 400', 400", 400"', 400"", etc. dependent on real world environmental factors such as terrain, morphology, foliage, etc., physical factors related to each specific prospective candidate base station site such as height, antenna placement locations, equipment, technology related factors such as antenna types, maximum output powers and receiver sensitivities, etc.

In addition relevant to this discussion as shown in FIG. 1B is a Control and Alarming Mainframe 120 (CAM), the existence of this unit is optional and is not required for success of this radio survey methodology but will greatly enhance operation. The function of the Control and Alarming Mainframe 120 (CAM) is to provide overall control and supervisory functions for the reverse radio path point-to multipoint radio survey. This is achieved by setting up and maintaining suitable terrestrial and/or wireless modem communication links over any existing telecommunications systems in the area under test.

Figure 2:
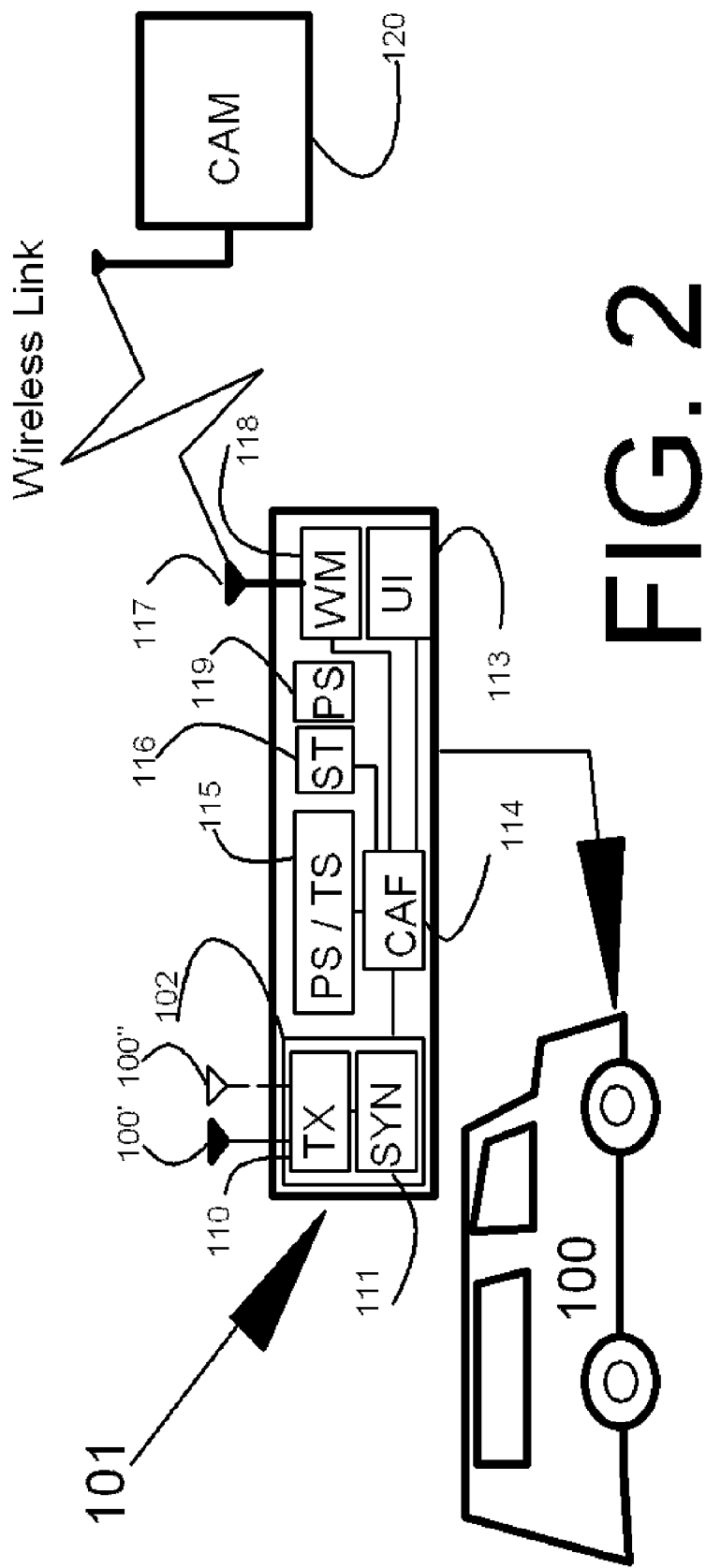
FIG. 2 block diagram showing both the Control and Monitoring Mainframe (CAM) entity and the various blocks comprising the Mobile Test Transmitter (MTTX) that is used in the system survey vehicle during the tests carried out in accordance with the methodology set forth in this invention.

FIG. 2 Preferred Embodiment

The Mobile Test Transmitter 101 (MTTX) is shown in FIG. 2. The Mobile Test Transmitter 101 (MTTX) is comprised of Control and Alarm Function 114 (CAF) this performs all the control, alarming functions and even some simple computational tasks if so required in certain cases relative to the stored results of the Mobile Test Transmitter 101 (MTTX) and is connected via suitable internal electronic data communications buses to all the other blocks in the Mobile Test Transmitter 101 (MTTX). It will be appreciated by one skilled in the art that this Control and Alarm Function 114 (CAF) will be comprised in most cases or a single board microcomputer of micro-controller with all associated firmware and software stored in appropriate on board ROM or RAM as required.

One of the units in the Mobile Test Transmitter 101 (MTTX) which is controlled and monitored by the Control and Alarm Function 114 (CAF) is the Transmitter Unit 102 (TU) this unit is composed of a suitable Synthesizer 111 (SYN), a Radio Frequency Transmitter 110 (TX) and a transmit antenna(s) 100', 100", etc. The Synthesizer 111 (SYN) sets both the waveform and the transmit frequency the Radio Frequency Transmitter 110 (TX) is to operate at during the test based on the information it receives from the Control and Alarm Function 114 (CAF). The Control and Alarm Function 114 (CAF) also controls the power setting and mode of operation (modulation) of the Radio Frequency Transmitter 110 (TX) as required.

Another unit connected to and monitored by the Control and Alarm Function 114 (CAF) is the Positioning/Timing System(s) 115 (PS/TS). The Positioning/Timing System 115 (PS/TS) can be made up of any of a number of various positioning and timing technologies, it is required to track accurately a very exact geographical location of the Mobile Test Transmitter 101 (MTTX) unit with respect to time as it moves thought-out the area where the reverse path radio test is being preformed. There are various ways to construct an accurate Positioning/Timing System 115 (PS/TS), for any person involved in the art a way that clearly comes to mind is the use of a suitable Global Positioning Receiver (GPS) with its accompanying external GPS antenna.

FIG. 2 of the preferred embodiment under discussion also contains a suitable Storage Unit 116 (ST) as being part of the Mobile Test Transmitter 101 (MTTX) this is used mainly to store the positioning and corresponding time stamp data that is collected during the survey process as the Mobile Test Transmitter 101 (MTTX) moves about the geographical area. It can also store other pertinent data related to the test process such as Radio Frequency Transmitter 110 (TX) power and mode of transmission, Synthesizer 111 (SYN) frequency and waveforms as well as any alarms received from the various Stationary Test Receivers 201 (STRX) via the Control and Alarm Mainframe 120 (CAM). All data stored in the Storage Unit 116 (ST) or read from it is accessed via the User Interface 113 (UI) under control of the Control and Alarm Function 114 (CAF). Those skilled in the art at hand will know that Storage Unit 116 (ST) can take on any of a number of forms the most likely being a solid-state drive, hard-drive, flash-drive, etc. or other well know form of electronic storage. In addition it may not be necessary to use Storage Unit 116 (ST) if some other means of external storage such as a laptop computer is used connected to the Mobile Test Transmitter 101 (MTTX) via the User Interface 113 (UI), however, it may be prudent to use both as one will function as backup for the other in case of failure. The User Interface 113 (UI) is the external connection through which the Mobile Test Transmitter 101 (MTTX) communicates with and gets commands from the outside world. It is used by the user to specify frequency, power and mode of transmission both before or during the radio survey, to monitor Mobile Test Transmitter 101 (MTTX) and optionally overall system Stationary Test Receivers 201 (STRXs) status while a test is in progress and to download the test results stored in the Storage Unit 116 (ST) after the radio survey is completed if that is required. For those involved in the art the User Interface 113 (UI) in it most simple form is nothing more than a port to facilitate communication between an external computer and the Mobile Test Transmitter 101 (MTTX) as overseen by the Control and Alarm Function 114 (CAF).

In addition to those blocks of the Mobile Test Transmitter 101 (MTTX) shown in FIG. 2 there will also be a suitable Power Supply 119 (PS) unit to power up all the various parts of the Mobile Test Transmitter 101 (MTTX). It is to be noted that the power requirements in this case are not so difficult to meet as would likely be the case when point-to-point forward-link radio surveys are preformed because here the mobile transmitter need only output a lower value of power comparable to that of a mobile phone and not comparable to that of a radio base station as is the case in forward link radio surveys.

The last block of the Mobile Test Transmitter 101 (MTTX) is a Wireless Modem 118 (WM) and its external antenna 117. The Wireless Modem 118 (WM) is used to connect the Mobile Test Transmitter 101 (MTTX) with the Control and Alarm Mainframe 120 (CAM) located at some remote location. For those involved in the art the Wireless Modem 118 (WM) can take on various forms including a wireless modem, mobile telephone, etc. dependent on the situation at hand and existent previous coverage and wireless service in the area. The Wireless Modem 118 (WM) is optional but its existence in conjunction with the Control and Alarm Mainframe 120 (CAM) enhances both the functionality and reliability of this reverse link survey test system greatly. Use of the Control and Alarm Mainframe 120 (CAM) enable collection of alarm data and even live test results from the various Stationary Test Receivers 201 (STRXs) operating to perform the test. These include information such as loss of timing signal, receiver and storage faults, power loss or even external tampering. In addition the user can send various control commands thru the User Interface 113 (UI) under the control of the Control and Alarm Function 114 (CAF) and Wireless Modem 118 (WM) and out to the Stationary Test Receivers 201 (STRXs). This could include such things as a power up, start test command, shut down, pause commands or even retune to a new frequency or mode of operation command while a test is being preformed. As well as receiving conformations for any changes that have been told to take place. Note also that all this can be done while in the drive test vehicle without actually visiting the candidate base station locations once a test is under way.

Alternatively, a test engineer or test manager, located remotely from the drive test vehicle, would be able to use the same method to control and configure test parameters for the (MTTX) and (FTRXs). Here the (CAM) would serve as a centralized control node, to relay the test engineer's configuration commands to the (FTRXs), as well as to the (MTTX) via the (WM) module.

An advantage of this centralized control approach is that a single experienced test engineer would be able to configure and manage several test teams simultaneously. These test teams would be operating separate (MTTXs) in different test vehicles. The different test teams may be executing their respective tests in the same geographical area (same test sites), or in widely dispersed geographical locations (different test sites). This capability will result in higher efficiency of test execution, and lower the overall cost and expense of the testing process.

The last part illustrated in FIG. 2 is the Control and Alarm Mainframe 120 (CAM). The Control and Alarm Mainframe 120 (CAM) as explained above is separate from the Mobile Test Transmitter 101 (MTTX) and it serves mainly as an intelligent communications relay link between the Mobile Test Transmitter 101 (MTTX) and all or some of the deployed Stationary Test Receivers 201 (STRXs). For this purpose it uses established telecommunications links already existent in the area. The Control and Alarm Mainframe 120 (CAM)—Mobile Test Transmitter 101 (MTTX) link must be via some wireless or satellite communications system while those links between the Control and Alarm Mainframe 120 (CAM) and Stationary Test Receivers 201 (STRXs) can be terrestrial or wireless or a hybrid mixture of both 700, 700', 800, 800', 800". For those familiar with the art the Control and Alarm Mainframe 120 (CAM) will most likely be a personal computer, modem and, router of some sort connecting the two sides together. The functionality of such a system and the role the Control and Alarm Mainframe 120 (CAM) plays in it has already been discussed above. In addition this Control and Alarm Mainframe 120 (CAM) can also serve as a data post-processor for crunching the data collected via this survey process.

FIG. 3 Preferred Embodiment

FIG. 3 shows the block diagram of a Stationary Test Receiver 201 (STRX). As is the case with the Mobile Test Transmitter 101 (MTTX), the Stationary Test Receiver 201 (STRX) contains a Control Alarm Function 214 (CAF) this performs all the control and alarming functions of the Stationary Test Receiver 201 (STRX). It is connected via internal buses to all other blocks in the Stationary Test Receiver 201 (STRX). As is the case with the Mobile Test Transmitter 101 (MTTX) this Control Alarm Function 214 (CAF) is comprised in most cases of a single board microcomputer or micro-controller with all associated firmware and software stored in appropriate on board ROM or RAM as required. Here the Control Alarm Function 214 (CAF) controls the Receiver Unit 202 (RU).

The Receiver Unit 202 (RU) is if composed of a Frequency Synthesizer 211 (SYN), and a Radio Frequency Receiver 210 (RX). In this case the Frequency Synthesizer 211 (SYN) sets the receive frequency the Radio Frequency Receiver 210 (RX) is to operate at during the test based on the information it receives from the Control and Alarm Function 214 (CAF). The Received Signal Strength measured by (RX) is fed as a digital value signal into the Control and Alarm Function 214 (CAF) to be stored and analyzed after the radio survey if completed in most cases. The Control and Alarm Function 214 (CAF) also controls another unit called the Radio Frequency Switch 219 (RFS). This unit acts as a RF multiplexer or comutator to systematically sample the received signal strength at each of the various antenna ports 212. By using this configuration it is possible to use one receiver Radio Frequency Receiver 210 (RX) to measure the RF signal strength on more than just one antenna at each radio base station test site. Thus not only can probable omni base station test sites be studied but multi-sector site configurations can also be investigated. In addition the characteristics of different receive antennas could be studied or even similar antennas but at varying heights can be measured. For the multi antenna configuration the Control and Alarm Function 214 (CAF) controls the switching of the Radio Frequency Switch 219 (RFS) so that the receiver is able to measure the signal strength being received at antenna in a systematic and timely manner.

Another unit connected to and monitored by the Control and Alarm Function 214 (CAF) is the Timing System 215 (TS). The Timing System 215 (TS) can be made up of any of a number of various time tracking technologies it is required to place accurate timestamps for each sample of received signal strength to be used as a method of associating the Mobile Test Transmitter's 101 (MTTX) location with the signal strength received at that particular moment. There are various ways to construct an accurate (TS), for any person involved in the art the Global Positioning Receiver (GPS) system is an excellent choice since it has very accurate timing data in its signal.

FIG. 3 of the preferred embodiment also contains a Storage Unit 216 (ST) this is used to store the digitized signal strength received on the reverse radio link 500, 500', 600, 600', 600" from the Mobile Test Transmitter 201 (MTTX) at the Radio Frequency Receiver 210 (RX) input to the Stationary Test Receiver 201 (STRX) and the corresponding time stamp data that is collected during the survey process as the Mobile Test Transmitter 101 (MTTX) moves about the geographical area. It can also store other pertinent data related to the test process and any alarms generated in the Stationary Test Receiver 201 (STRX) during operation. All data stored in or read from here is accessed via the Control and Alarm Function 214 (CAF). Those skilled in this art will know that Storage Unit 216 (ST) can take on any of a number of forms the most likely being a hard-drive, solid-state drive, flash-drive, or other well know form of electronic storage. Also since the receiver units work remotely it is quite necessary for Storage Unit 216 (ST) in this case to be very reliable and to have some type of storage backup. As is the case with the Mobile Test Transmitter 101 (MTTX) a User Interface 213 (UI) exists in every Stationary Test Receiver 201 (STRX) it is the external connection through which the Stationary Test Receiver 201 (STRX) communicates with outside world. It is used by the user to specify frequency, number of antennas, future test start time and mode of transmission before any actual testing takes place during the radio survey, and to download the test results stored in the Storage Unit 216 (ST) after the radio survey is completed if that is required. For those involved in this the art User Interface 213 (UI) in it most simple form is nothing more than a port to facilitate communication between an external computer and the Stationary Test Receiver 201 (STRX) via the Control and Alarm Function 214 (CAF).

In addition to those blocks of the Stationary Test Receiver 201 (STRX) shown in FIG. 3 there is a Power Supply and Battery Charging 218 (PS/CH) Unit to power up all the various parts of the Stationary Test Receiver 201 (STRX). Since the Stationary Test Receiver 201 (STRX) units are designed to work in remote locations where power is not necessarily readily available The power consumption is designed to be very low and to use rechargeable battery packs with the facility to use standard AC power if that is available at the prospective radio base station candidate sites where the Stationary Test Receiver 201 (STRX) is placed during a test.

The last block of the Stationary Test Receiver 201 (STRX) in FIG. 3 is a Modem 217 (MOD). This modem in optional and is not required for operation of the Stationary Test Receiver 201 (STRX). The modem used here could be either a Terrestrial Modem 217 (MOD) or a Wireless Modem 217 (MOD) as used in the Mobile Test Transmitter 101 (MTTX). As is the case for the Mobile Test Transmitter 101 (MTTX) it is used to connect the Control and Alarm Function 217 (CAF) of the Stationary Test Receiver 201 (STRX) with the Control and Alarm Mainframe 120 (CAM) located at some remote location. The Control and Alarm Mainframe 120 (CAM) existence enhances both the functionality and reliability of this reverse link radio survey test system as discussed above. It can be used to send any alarm data to the Control and Alarm Mainframe 120 (CAM) and thus to the drive team or even live test results.

In addition each one of the Stationary Test Receiver 201 (STRX) units has additional internal circuitry which when enabled will detect external tampering during a radio survey test causing the unit to trigger an anti-tampering alarm and attempt to warn those in drive-test vehicle via the Control and Alarm Mainframe 120 (CAM) using the Stationary Test Receiver 201 (STRX) modem.

FIG. 3 also shows the Control and Alarm Mainframe 120 (CAM) whose details were already discussed with the detailed embodiments of FIG. 2.

Operation of the Invention

Operation of this invention can be summarized during a Point-to-Multipoint Reverse Radio Path Survey as follows:
Before actually carrying out a radio survey of any candidate base station location sites is performed. The following must be taken care of:
Probable candidate base station locations must be defined.
Purpose of the test must be ascertained (i.e. propagation model tuning, coverage verification, best candidate selection, antenna selection, co-channel or co-pilot studies, etc.).
Suitable or multiple suitable radio frequency must be obtained and clear for us during the tests.
Proper drive-test routes to be driven during the survey must be studied and designed based on the current drives desired expectations.
All the Mobile Test Transmitters 101 and Stationary Test Receiver s 201 must be made ready, tested for problems, batteries fully charged and fully programmed with regard to frequency of operation, transmit power, mode of operation, time to start test, etc.

The Stationary Test Receiver s 201 are all placed along at the perspective base station locations to be tested and connected to the respective antenna(s) configuration to be used for each particular location.

During the actual test as the test vehicle 100 moves along the test route, it transmits radio frequency signals produced by the Mobile Test Transmitter 101 (MTTX) at the predetermined power level and previously defined test frequency. As Mobile Test Transmitter 101 (MTTX) is moving along those predefined test route(s) all of the following is occurring:

The Position and Timing System 115 (PS/TS) in Mobile Test Transmitter 110 (MTTX) is tracking the exact position relative to time very accurately. All of this information is in turn being stored via the Control and Alarm Function 114 (CAF) to the Storage Unit 116 (ST) or outputting to an external storage location via the User Interface 113 (UI). This occurs all during the process of the Reverse Path Radio Survey As the Mobile Test Transmitter 101 (MTTX) moves along the drive route(s) 900 during the test process the reverse link 500, 500', 600, 600', 600" signal being transmitted from the transmit antenna 100' is being received by the various Stationary Test Receiver s 201 distributed throughout the region under test at the various prospective base station sites 200, 200', 300, 300', 300", etc. The strength of this signal arriving at each of these locations varies greatly dependent on:
  a. The distance between that location and the current location of the drive test vehicle 100.
  b. The actual configuration, height and type of antennas at each test site and their orientation in the case of sectorized sites relative to the instantaneous location of the drive test vehicle 100.
  c. The terrain, foliage and morphology that surrounds each prospective site and how these factors relate to the instantaneous location of the drive test vehicle 100 containing the Mobile Test Transmitter 101 (MTTX).

The received signal strength arriving at each Stationary Test Receiver 201 (STRX) placed at a probable base station location is sampled, digitized and stored in the Receiver Storage Unit 216, along with an accurate timestamp generated by the Timing System 215. This time stamp data is used to correlate received signal to drive test vehicles 100 instantaneous location during the test. If the site configuration requires the use of multiple antenna configurations this too is accommodated by taking signal strength samples from each of them in turn using the Radio Frequency Switch 219 (RFS) in each respective Stationary Test Receiver 201 (STRX).

The above process continues until all the route(s) defined for the radio system survey at hand are completed and all data is collected. This is true unless some fault occurs somewhere in the test system, possibly at one of the candidate base station test locations. If this happens and it is possible to detect the problem via the alarming functions built into the system then testing can resume after the problem is corrected. It should also be possible to do some changes on the fly during testing by varying some of the test characteristics over the air using the systems built in controlling characteristics. This could include changing the test frequency to another one for only some of the candidate sites being tested without actually going to that location.

Upon completion of all testing in a satisfactory manner all the Stationary Test Receiver s 201 are collected from the prospective base station test candidates. All the test data (signal strength and timestamps) is collected from the Stationary Test Receiver s 201 (STRXs) as is the data gathered by the Mobile Test Transmitter 101 (power levels, transmission mode, frequency(s), location information and timestamps).

The next step is initial preprocessing of the collected data. Here an algorithm is used to match received signal strength with the location it was launched from; this is done easily by matching up the time stamps.

Once the matching is finished the data for each site can be analyzed in many ways as mentioned previously including but not limited to filtering measurements at the limits of the receivers dynamic range, temporal and spectral averaging. This is in addition to the possibility of doing more sophisticated analysis such as correlation between the signals collected from the different sites, such information can prove useful in estimating performance when some advanced techniques are used such as macro-diversity or transmit diversity. It is also useful in accurately and quickly assessing the impacts of frequency and pilot planning choices on system performance.

CONCLUSIONS, RAMIFICATIONS, AND SCOPE

In conclusion it is clear that the main advantage of this method is that it allows a plurality of site candidates evaluated simultaneously and thus a larger geographical area to be tested (with a single test drive). This has obvious advantages of speed and cost effectiveness especially when used towards the goal of propagation model tuning especially when a new wireless technology roll-out is taking place in a new frequency band.

Also another very important advantage is that this test can be carried out using only one single test tone (frequency) which is quite often very important during new wireless network deployments or upgrades to a new technology in an already used spectrum both of which usually have constraints relative to available test frequencies available for testing purposes.

Another unique advantage is to test multiple antennas and/or multiple antenna placement configurations with only a minimal increase (antennas and cables) in the needed test equipment at each test site.

It enables some flexibility in the test site configuration. Since the receivers at the test sites are low power devices that can use battery or other forms of power sources, this means that they can be setup in almost any location, including but not limited to rooftops, communication towers, cranes, temporary structures, balloons, etc.

Unique in that it allows testers possible remote control operation and observation of the status of the test sites. This is accomplished through the use of an optional wireless or terrestrial modem at each test receiver. This greatly simplifies the test execution, as well as reduces the need for retests due to failures undetected until after the test.

It enables full correlation statistics between different test sites, or different antennas on a single test site to be easily and accurately obtained from the post-processed data.

Full scope of this invention will be determined by the appended claims and their legal equivalents.

What is claimed is:

1. A method for simultaneously performing a radio frequency evaluation survey of multiple base station site candidates, the method comprising:
   i) a plurality of stationary receiver units, wherein at least one stationary receiver unit being located at each base station candidate site;
   ii) a mobile test transmit unit located in a test vehicle;
   iii) transmitting one or more radio test signals from said mobile test unit;

iv) recording a time stamp for each location along the drive route 900 of said test vehicle, the power of said transmitted radio signals, and geographical coordinates of each location;

v) receiving said radio test signals at each of said stationary test receivers, measuring the signal strength of said radio test signals, and recording said signal strength of these measurements along with a time stamp for each measurement;

vi) correlating said recorded signal strength measurements with the location of the mobile test unit for each recorded corresponding time stamp;

vii) calculating the path loss between the location of each base station candidate site, and each location along the drive route 900 visited by said test vehicle during the test survey as the ratio of transmitted and received test signals for the timestamp corresponding to said location;

whereby said path loss information for said base station candidate sites is obtained with a single drive of said test vehicle throughout the desired test area.

2. The method of claim 1, wherein a stationary test receiver unit comprising:

i) a receiver control and alarm function block that performs all control and alarming functions of said fixed test receiver, wherein said alarm function block is connected via internal electronic data communications buses to all other blocks of the test receiver unit;

ii) a receiver unit comprising:
   (a) a radio frequency receiver that receives, decodes, measures and digitizes said test signals;
   (b) a frequency synthesizer that sets the radio frequency of said radio frequency receiver, wherein the selection of said radio frequency is determined by commands from said receiver control and alarm function block;

iii) a plurality of receive antennas connected to the input of said radio frequency receiver via a radio frequency switch;

iv) said radio frequency switch wherein said radio frequency receiver is systematically connected to, and samples the output of, one or more of said receive antennas;

v) a receiver timing system wherein an accurate time stamp is generated for each sample of said received radio test signals;

vi) a receiver storage means to store the digitized radio signal strength measurements of said received test signals, and the corresponding time stamps generated by said receiver timing system;

vii) a receiver user interface wherein an operator provides configuration, and control commands to said test receiver, and stored signal strength measurements and their corresponding time stamps are downloaded to external devices;

viii) a wireless modem and its external antenna, wherein the modem may be used to wirelessly connect said test receiver unit to external locations;

ix) a power supply and battery charging unit to supply regulated power to all parts of said fixed test receiver at the level required for all its various constituent parts;

wherein said test receiver, receives said radio test signals, measures the signal strength received at said receive antennas, generates an accurate time stamp corresponding to each received signal measurement, and records said measurements and the corresponding time stamp for future download and analysis.

3. A stationary test receiver of claim 2 wherein said receiver control and alarm function block is comprised of a single board microcomputer with all associated processors, firmware and, software stored in appropriate on board memory elements.

4. A stationary test receiver of claim 2 wherein said receiver timing system is comprised of a global positioning receiver with its accompanying external antenna.

5. A method of claim 1 wherein a mobile test transmitter comprising:

i) a transmitter control and alarm function block that performs all control and alarming functions of said mobile test transmitter, wherein said alarm function block is connected via internal electronic data communications buses to all other blocks of said mobile test transmitter;

ii) a radio frequency transmitter unit comprising:
   (a) a radio frequency transmitter that generates said radio test signals;
   (b) a plurality of transmit antennas connected to output of said radio frequency transmitter to transmit said radio test signals;
   (c) a synthesizer unit to synthesize waveforms of said test signals, and set the transmit frequency of said radio frequency transmitter, wherein the selection of said radio frequency and waveforms is determined by commands from said transmitter control and alarm function block iii) a transmitter positioning and timing system to track accurately the exact geographical location and the exact time said mobile test transmitter is at that geographical location, iv) a transmitter storage means to store the exact geographical location and the exact time said mobile test transmitter is at that exact geographical location as it moves about the geographical area of the radio coverage survey, wherein the transmitter storage means may also store other pertinent data including alarms, transmitter frequency and power level;

v) a transmitter user interface wherein an operator provides configuration and control commands to said test transmitter, and stored test locations and their corresponding time stamps, and any other data stored in said transmitter storage means, are downloaded to external devices;

vi) a wireless modem and its external antenna wherein the modem may be used to wirelessly connect said mobile test transmitter unit to external locations;

vii) a power supply unit to supply regulated power from the mobile test vehicle to said mobile test transmitter at the power levels required for all its various constituent parts;

wherein said mobile test transmitter, generates and transmits said radio test signals, accurately tracks the exact geographic location of said mobile test transmitter as it moves about the geographical area of the radio coverage survey, generates an accurate time stamp corresponding to each exact geographic location, and records said locations and the corresponding time stamp for future download and correlation with receive measurements from said stationary receiver units.

6. A mobile test transmitter of claim 5 wherein said transmitter control and alarm function block is comprised of a single board microcomputer with all associated processors, firmware and, software stored in appropriate on board memory elements.

7. A mobile test transmitter of claim 5 wherein said transmitter positioning and timing system is comprised of a global positioning receiver with its accompanying external antenna.

8. A mobile test transmitter of claim 5 wherein said transmitter positioning and timing system is comprised of a dead-reckoning system.

9. A mobile test transmitter of claim 7 wherein said transmitter positioning and timing system is comprised of a dead-reckoning system to provide a backup system in case the global positioning receiver loses satellite coverage.

10. A method of claim 1 further comprising a control and alarming mainframe connected to each of said stationary test receiver units via wireless or wired connection, and also connected to said mobile test transmit unit via wireless connection.

11. A control and alarming mainframe of claim 10 wherein said control and alarming mainframe collects operational data, alarms, faults and other information from said stationary test receiver units, and relays this information to said mobile test transmit unit.

12. A control and alarming mainframe of claim 10 wherein said control and alarming mainframe receives control and configuration commands from said mobile test transmit unit, intended for one or more of said stationary test receiver units, and said control and alarming mainframe relays commands to said stationary test receiver units.

13. A control and alarming mainframe of claim 12 wherein said control and alarming mainframe receives responses for and acknowledgements to said control and configuration commands, from responding stationary test receiver units, and relays said responses and acknowledgements to said mobile test transmit unit.

14. A control and alarming mainframe of claim 10 wherein said control and alarming mainframe collects operational data, alarms, faults and other information from said stationary test receiver units, and said mobile test unit, and relays this information to an external user or control system for further action.

15. A control and alarming mainframe of claim 10 wherein said control and alarming mainframe receives control and configuration commands from external user or control system, intended for one or more of said stationary test receiver units, or for one or more of said mobile transmit units, and said control and alarming mainframe relays these commands to said stationary test receiver units and said mobile transmit units.

16. A control and alarming mainframe of claim 15 wherein said control and alarming mainframe receives responses for and acknowledgements to said control and configuration commands, from responding stationary test receiver units, or responding mobile transmit units, and relays said responses and acknowledgements to said external user or control system.

17. A control and alarming mainframe of claim 10 comprising of a readily available commercial personal computer, modem and, all related firmware, software and, algorithms.

18. A method of post-processing samples of measured radio test signals collected per the method of claim 1, the method comprising:
   i) correlating a time stamp associated with each digitized sample of said test signals received by a fixed test receiver unit, to the corresponding time stamp collected by said mobile transmit unit;
   ii) associated said time stamp collected by said mobile transmit unit with an exact geographical location of said test vehicle;
   iii) calculating the path loss and phase difference between said base station candidate, corresponding to said fixed test receiver unit, and said exact geographical location of said test vehicle;
   iv) whereby said path loss is calculated as the ratio of transmitted and received test signals for the timestamp corresponding to said location;
   b) whereby said phase difference is calculated as the difference in phase of transmitted and received test signals for the timestamp corresponding to said location.

19. The method of claim 18 wherein said calculation of path loss and phase difference is employed to characterize multiple input multiple output channel between said base station candidate location and test vehicle location, wherein the method of claim 18 is repeatedly applied to each pair of transmit and receiver antennas, individually.

20. The method of claim 18 wherein filtering is applied to the collected signal strength data samples, prior to or following the calculation of the corresponding path loss or phase difference values.

21. The method of claim 20 wherein said filtering is applied to signal strength data samples spaced evenly in time, to achieve temporal averaging of the path loss values.

22. The method of claim 20 wherein said filtering is applied to signal strength data samples spaced evenly in distance, to achieve spatial averaging of the path loss values.

23. The method of claim 18 wherein the correlation is calculated between two different path loss values obtained for two of the said based station candidate locations, or two receiver antenna locations at the same based station candidate locations, or two receiver antennas at different based station candidate locations.

* * * * *